United States Patent [19]

Higashimata et al.

[11] Patent Number: 5,143,429
[45] Date of Patent: Sep. 1, 1992

[54] HYDRAULIC MODULATOR WITH EQUAL, OPPOSING CHAMBERS FORMED BY A PISTON

[75] Inventors: Akira Higashimata, Yokosuka; Takeshi Fujishiro; Shigeki Yoshioka, both of Yokohama, all of Japan

[73] Assignee: Nissan Motor Co., Ltd., Yokohama City, Japan

[21] Appl. No.: 645,415

[22] Filed: Jan. 24, 1991

[30] Foreign Application Priority Data

Jan. 25, 1990 [JP] Japan .................. 2-13672

[51] Int. Cl.⁵ .......................... B60T 8/32; F15B 5/00
[52] U.S. Cl. .................. 303/115 EC; 303/116 R; 303/119 SV; 60/545; 60/567; 60/591
[58] Field of Search ............... 303/110, 119, 93, 115, 303/116, 113, 115 EC, 116 R, 113 R, 119 SV; 60/591, 545, 567, 569

[56] References Cited

U.S. PATENT DOCUMENTS

| | | | |
|---|---|---|---|
| 3,549,210 | 12/1970 | Birge et al. | 303/115 |
| 3,871,497 | 3/1975 | Bessiere | 60/545 X |
| 3,953,082 | 4/1976 | Smith | 303/119 X |
| 4,206,605 | 6/1980 | Mehren et al. | 60/545 |
| 4,578,951 | 4/1986 | Belart et al. | 60/591 X |
| 4,758,054 | 7/1988 | Brown | 303/116 X |
| 4,815,792 | 3/1989 | Tröster | 303/113 R |
| 4,861,116 | 8/1989 | Bernhardt et al. | 303/116 X |
| 4,865,398 | 9/1989 | Takeuchi et al. | 60/591 X |
| 4,898,434 | 2/1990 | Kohno et al. | 303/119 SV |

FOREIGN PATENT DOCUMENTS

| | | |
|---|---|---|
| 3832538 | 3/1990 | Fed. Rep. of Germany ...... 303/116 |
| 51-6308 | 2/1976 | Japan . |
| 56-254 | 1/1981 | Japan . |

*Primary Examiner*—Matthew C. Graham
*Assistant Examiner*—Josie A. Ballato
*Attorney, Agent, or Firm*—Foley & Lardner

[57] ABSTRACT

A system for controlling a fluid pressure includes a pressure modulating cylinder unit having a piston and a cylinder housing defining first and second fluid chambers separated by the piston, a cutoff valve unit for isolating the first and second chambers from a pressure source and from each other, and a motor unit for pushing and pulling the piston to vary the fluid pressure in the first chamber. When the system is used for controlling a brake fluid pressure of a vehicle, the first chamber is connected with a wheel cylinder, and the valve unit is arranged to isolate the wheel cylinder and the first and second chambers from a master cylinder.

21 Claims, 7 Drawing Sheets

HYDRAULIC MODULATOR WITH EQUAL, OPPOSING CHAMBERS FORMED BY A PISTON

BACKGROUND OF THE INVENTION

The present invention relates to a system for controlling a fluid pressure, and more specifically to a hydraulic modulator which normally allows a fluid pressure to flow from a pressure supplying means to a hydraulic actuator, and which interrupts the fluid communication between the pressure supplying means and the hydraulic actuator and controls the fluid pressure supplied to the hydraulic modulator independent of the pressure of the supplying means when the fluid pressure of the supplying means becomes unable to operate the hydraulic actuator property.

Japanese Patent (post examination) Publication No. 56-254 shows one conventional hydraulic modulator for an anti-skid brake control system. This modulator uses a ball valve for disconnecting a wheel cylinder and a master cylinder, and a pneumatic diaphragm mechanism for operating the ball valve and modulating the fluid pressure of the wheel cylinder. However, the diaphragm mechanism of this modulator must be large enough to produce a required mechanical force.

SUMMARY OF THE INVENTION

It is an object of the present invention to provide a fluid pressure control system, or a hydraulic modulator, which can control a fluid pressure with a relatively small force.

Figure 8:
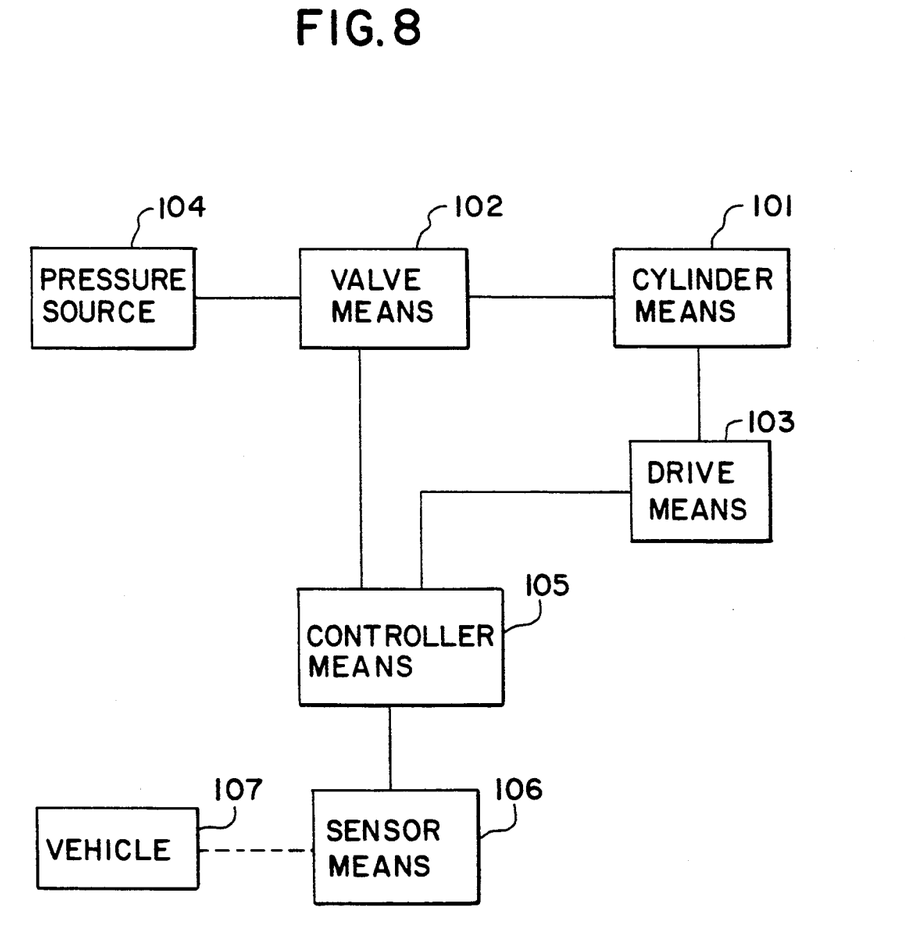
FIG. 8 is a block diagram showing connections of various means used in the present invention.

According to the present invention, a fluid pressure control system comprises a cylinder means 101, a valve means 102 and a drive means 103, as shown in FIG. 8. The cylinder means comprises a piston and a housing means defining first and second fluid chambers which are separated by the piston. The valve means is a means for opening the first and second chambers to a fluid pressure source 104, and closing the first and second chambers so that the first and second chambers form, respectively, first and second closed hydraulic circuit sections which are isolated from each other and further isolated from the pressure source. The drive means is a means for moving the piston to vary a volume of the first chamber and thereby to vary a fluid pressure confined in the first closed circuit section.

Both chambers are normally held open to the pressure source so that the fluid pressures in both chambers are equal to each other. Therefore, the drive means can easily push or pull the piston with a small force because the equal pressures are confined in both chambers by the valve means.

BRIEF DESCRIPTION OF THE DRAWINGS

FIG. 1 is a schematic view of a fluid pressure control system according to a first embodiment of the present invention. FIG. 1 shows a hydraulic modulator 1 in section.

FIG. 4 is a schematic view showing a fluid pressure control system according to a second embodiment of the present invention. FIG. 4 shows a valve assembly 50 and a cylinder assembly 51 in section.

DETAILED DESCRIPTION OF THE INVENTION

Figure 1:
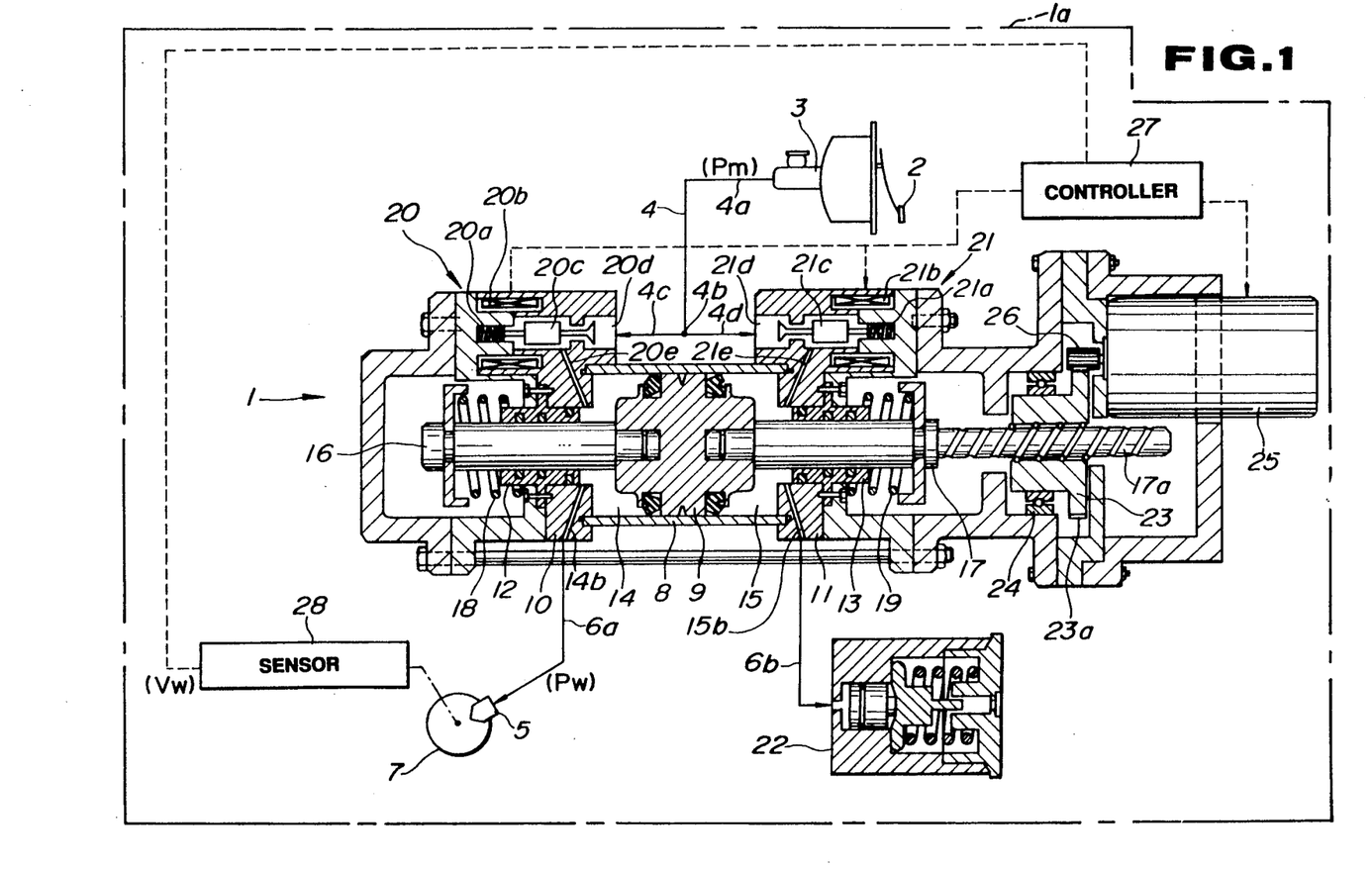
Figure 2:
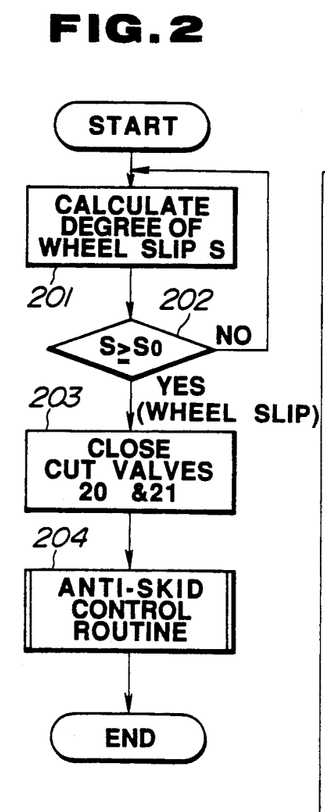
FIGS. 2 and 3 show a control program performed by an anti-skid controller 27 shown in FIG. 1.
Figure 3:
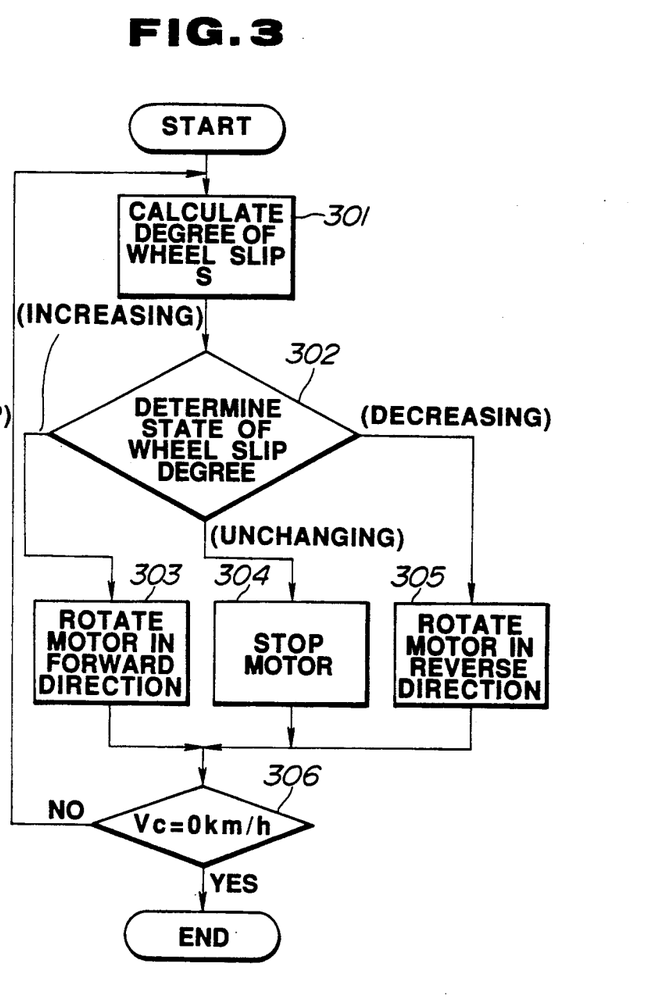

A first embodiment of the present invention is shown in FIGS. 1, 2 and 3. A fluid pressure control system shown in FIG. 1 includes an anti-skid brake control modulator (or anti-skid actuator) 1 for adjusting brake actuation force of a wheeled vehicle 1a such as an automobile. The fluid pressure control system of this embodiment is an anti-skid brake control system also known as a wheel slip brake control system, which automatically controls the degree of rotational wheel slip during braking.

The anti-skid brake control system further includes a brake pedal 2, a master cylinder 3, a fluid pressure conductor means defining a brake fluid supply passage 4, at least one wheel cylinder 5, and a fluid pressure conductor means defining first and second brake fluid outlet branch passages 6a and 6b. The master cylinder 3 delivers a fluid pressure Pm in accordance with a brake pedal force applied by the driver on the brake pedal 2. The master cylinder 3 serves as a fluid pressure source or a fluid pressure supplying means. The supply passage 4 is a brake line for transmitting the master cylinder fluid pressure Pm from the master cylinder 3 to the anti-skid hydraulic modulator 1. In this embodiment, the supply passage 4 has a common supply passage 4a extending from the master cylinder 3 to a branch point 4b, a first inlet branch passage 4c extending from the branch point 4b, and a second inlet branch passage 4d extending from the branch point 4b. The anti-skid modulator 1 receives the master cylinder pressure Pm as an input pressure, and delivers an output pressure Pw to the wheel cylinder 5 through the first outlet branch passage 6a. The wheel cylinder 5 is a hydraulic actuator for converting hydraulic fluid pressure to mechanical force for actuation of the brake. The wheel cylinder 5 of this embodiment is arranged to retard, stop and hold a braking disc or rotor 7 which is connected with one wheel of the vehicle so that the braking disc 7 rotates together with the wheel.

The hydraulic modulator 1 includes a cylinder member 8 and a piston 9 which is slidably received in a bore of the cylinder member 8. Both ends of the bore of the cylinder member 8 are closed, respectively, by first and second end plug members 10 and 11, and first and second bearing seal members 12 and 13. First and second fluid chambers 14 and 15 are formed on both sides of the piston 8 by the cylinder member 8 and the first and second end members 10 and 11. In this embodiment, the cylinder member 8, the first and second end members 10 and 11 and the first and second seal members 12 and 13 serve as a housing means for defining the first and second fluid chambers 14 and 15 which are separated by the piston 8. First and second pistons rods 16 and 17 are attached to the piston 8. The first and second piston rods 16 and 17 extend in the opposite directions from the opposite sides of the piston 8. The first piston rod 16 is tightly received and slidably supported by the first seal member 12 so that the first fluid chamber 14 is sealed, and the first piston rod 16 is axially slidable.

Similarly, the second piston rod 17 is tightly received and slidably supported by the second seal member 13. A first return spring 18 is provided for applying a biasing force on the first piston rod 16 to push the piston rod 16 in the leftward direction as viewed in FIG. 1. A second return spring 19 is provided for applying a biasing force on the second piston rod 17 to push the second piston rod 17 in the rightward direction in FIG. 1. The first and second return springs 18 and 19 resiliently hold the piston 9 in a neutral position shown in FIG. 1. In this embodiment, the volumes of the first and second chambers 14 and 15 are equal to each other when the piston 9 is in the neutral position. The first and second springs 18 and 19 serve as a spring means for holding the piston 9 in the neutral position. In this embodiment, the first piston rod 16 projects out of the first chamber 14, and the first return spring 18 is disposed between the projecting end of the first piston rod 16, and the stationary end member 10. Similarly, the second piston rod 17 projects out of the second chamber 15, and the second return spring 19 is located outside the second chamber 15. In this embodiment, the cylinder member 8, the piston 9 and the other members 12, 13, 16, 17, 18 and 19 constitute a cylinder means for modulating the fluid pressure.

The hydraulic modulator 1 further includes first and second cutoff valves 20 and 21. The first fluid chamber 14 is fluidly connected with the supply passage 4 through the first cutoff valve 20. The second fluid chamber 15 is fluidly connected with the supply passage 4 through the second cutoff valve 21. The first chamber 14 is further connected with a power chamber of the wheel cylinder 5 through the first branch passage 6a. The second chamber 15 is connected with a hydraulic accumulator 22 through the second branch passage 6b. Each of the first and second cutoff valves 20 and 21 is a normally open solenoid valve (electromagnetic valve) having a spring 20a or 21a, a solenoid 20b or 21b and a movable valve element 20c or 21c. The valve element 20c or 21c of each cutoff valve 20 or 21 is put, by the action of the spring 20a or 21a, in an open position to open the fluid passage when the solenoid 20b or 21b is deenergized, and put in a closed position when the solenoid 20b or 21b is energized. In this embodiment, the first and second cutoff valves 20 and 21 constitutes a valve means for opening and closing the first and second fluid chambers 14 and 15. The valve means may further include a part or the whole of the conductor means defining the supply passage 4, as shown at 102a in FIG. 7A. The first cutoff valve 20 has inlet and outlet ports 20d and 20e formed in its valve housing. Similarly, the second cutoff valve 21 has inlet and outlet ports 21d and 21e formed in its valve housing. The inlet ports 20d and 21d of both cutoff valves 20 and 21 are in fluid communication with the master cylinder 3 through the supply passage 4. The first inlet branch passage 4c extends from the branch point 4b to the inlet port 20d of the first cutoff valve 20, and the second inlet branch passage 4d extends from the branch point 4b to the inlet port 21d of the second cutoff valve 21. The outlet port 20e of the first cutoff valve 20 is in fluid communication with the first chamber 14, and the outlet port 21e of the second cutoff valve 21 is in fluid communication with the second chamber 15. In this embodiment, the outlet ports 20e and 21e of the first and second cutoff valves 20 and 21 are formed, respectively, in the first and second end members 10 and 11, and serves as inlet ports of the first and second chambers 14 and 15. In this embodiment, the first and second cutoff valves 20 and 21 and the cylinder means are integrated into a single block assembly. The first end member 10 serves as both the cylinder housing defining the first chamber 14, and the valve housing of the first cutoff valve 20. The second end member 11 serves as both the cylinder housing defining the second chamber 15 and the valve housing of the second cutoff valve 21. In this embodiment, the first cutoff valve 20 is disposed in (or at the end of) the first inlet branch passage 4c, and arranged to open and close the first inlet branch passage 4c, and the second cutoff valve 21 is disposed in (or at the end of) the second inlet branch passage 4d, and arranged to open and close the second inlet branch passage 4d. The first cutoff valve 20 can isolate only the first chamber 14 from the master cylinder 3, and cannot disconnect the second chamber 15 from the master cylinder 3. The second cutoff valve 21 can isolate only the second chamber 15 from the master cylinder and cannot isolate the first chamber 14 from the master cylinder 3. In each cutoff valve, the valve element 20c or 21c serves as a movable means for making and breaking the fluid connection between the inlet port 20d or 21d and the outlet port 20e or 21e. When the first and second cutoff valves 20 and 21 are closed, the hydraulic circuit shown in FIG. 1 is divided into three circuit sections which are a first circuit section including the first chamber 14, the first outlet branch passage 6a and the wheel cylinder 5, a second circuit section including the second chamber 15, the second outlet branch passage 6b and the accumulator 22, and a third circuit section including the master cylinder 3 and the supply passage 4.

The second piston rod 17 has an extension 17a which is in the form of a ball screw rod 17a. The ball screw rod 17a is received in a ball nut member 23. The ball nut member 23 is supported by a bearing 24 in such a manner that the ball nut member 23 is rotatable, but immovable along an axial direction of the piston rod 17. The ball nut member 23 has external gear teeth 23a which are engaged with teeth of a pinion 26 which is drivingly connected with a torque motor 25. The torque motor 25 and the speed reducing gear arrangement composed of the pinion 26 and the ball nut 23 serves as a drive means (or motor means) for causing the piston 9 to move to vary the volume of the first chamber 14. The drive means (or motor means) comprises a motor (or mover) for producing motion to push and pull the piston 9. In this embodiment, the motor 25 is an electric motor. The hydraulic modulator 1 of this embodiment is in the form of a single block assembly including the cylinder means, the first and second cutoff valves 20 and 21 of the valve means, and the drive means.

The anti-skid brake control system of this embodiment further includes an anti-skid electronic logic controller 27 and at least one wheel speed sensor 28. The electronic controller 27 is electrically connected with the solenoids 20b and 21b of the first and second cutoff solenoid valves 20 and 21, and the torque motor 25, and designed to control the first and second cutoff valves 20 and 21, and the torque motor 25. The wheel speed sensor 28 senses a peripheral speed Vw of the associated wheel, and sends a wheel speed signal to the controller 27.

The controller 27 performs a control program shown in FIGS. 2 and 3, and regulates (or modulates) the brake fluid pressure Pw so as to prevent a wheel skid condition and provide an optimum braking performance especially in an emergency or panic-stop situation.

At a first step 201 shown in FIG. 2, the electronic controller 27 calculates the degree of wheel slip S. The wheel slip degree (or wheel slip rate) S is equal to a quotient obtained by dividing a deviation of the wheel speed Vw from a vehicle body speed Vc, by the body speed Vc. That is, $S=(Vc-Vw)/Vc$. It is possible to determine the vehicle body speed Vc from the wheel speed Vw in a known manner.

At a next step 202, the controller 27 determines whether the wheel slip degree S is equal to or greater than a predetermined reference (threshold) value So (which is normally set equal to a value of the slip degree at which the friction coefficient between the wheel and road surface becomes maximum, and which is equal to 0.15, for example). If the slip degree S is smaller than the reference value So, then the controller 27 judges that there exists no wheel slip condition, and returns to the step 201. If the slip degree S becomes equal to or greater than the reference value So, then the controller 27 judges that the monitored wheel starts slipping, and proceeds to a step 203. At the step 203, the controller 27 energizes the solenoids 20b and 21b of both cutoff valves 20 and 21, and puts both valves 20 and 21 in the closed state. Thereafter, the controller 27 proceeds to a step 204, and performs an anti-skid control routine. In this embodiment, the controller 27 closes the first and second valves 20 and 21 simultaneously.

Therefore, when the wheel is free from slip, both of the solenoid cutoff valves 20 and 21 are in the off state to open the respective fluid passages, and the torque motor 25 remains in the off state, and allows the return springs 18 and 19 to hold the piston 9 in the neutral position. In this normal operation state, the master cylinder 3 is in fluid communication with the wheel cylinder 5 through the first fluid chamber 14. When the driver depresses the brake pedal 2, the master cylinder pressure Pm is transmitted through the first cutoff valve 20 and the first fluid chamber 14, to the wheel cylinder 5. In this case, the wheel cylinder 5 receives the wheel cylinder pressure Pw which is substantially equal to the master cylinder pressure Pm. In this way, the anti-skid brake control system of this embodiment ensures the normal braking operation. The second fluid chamber 15 is also kept in fluid communication with the master cylinder 3 by the second cutoff valve 21. Therefore, the master cylinder pressure Pm reaches the second fluid chamber 15, and holds the fluid pressure in the second chamber 15 equal to the fluid pressure in the first chamber 14.

FIG. 3 shows the anti-skid control routine. When a wheel slip occurs, the controller 27 brings the solenoid cutoff valves 20 and 21 to the on state, and then executes the anti-skid routine shown in FIG. 3. First, the controller 27 determines the wheel slip degree (wheel slip rate) S at a step 301 in the same manner as in the step 201. At a next step 302, the controller 27 determines whether the wheel slip degree S is in an increasing state, an unchanging state, or a decreasing state. If the wheel slip degree S is increasing, then the controller 27 produces a forward control signal at a step 303, and causes the torque motor 25 to rotate in a forward direction. If the wheel slip degree S is changeless, then the controller 27 produces a stop control signal at a step 304, and stops the torque motor 25. If the wheel slip degree 305 is in the decreasing state, then the controller 27 produces a reverse control signal at a step 305, and causes the motor 25 to rotate in a reverse direction. At a step 306, the controller 27 determines whether the vehicle body speed Vc is equal to 0 km/h. If it is not, then the controller 27 returns to the step 301. If the answer of the step 306 is affirmative, then the controller 27 returns to the control program shown in FIG. 2. Thus, the controller 27 repeats the loop of the steps 301-305 untill the vehicle has slowed to a safe speed.

In the case of the forward rotation of the torque motor 25, the pinion 26 driven by the motor 25 causes the ball nut 23 to rotate, and in turn the ball nut 23 causes the ball screw rod 17a of the second piston rod 17 to move in the rightward direction as viewed in FIG. 1. Therefore, the piston 9 is pulled in the rightward direction by the piston rod 17, and increases the volume of the first fluid chamber 14. During this, the first and second chambers 14 and 15 are isolated from the master cylinder 3, respectively, by the first and second cutoff valves 20 and 21 which are kept in the closed state. Moreover, the first and second fluid chambers 14 and 15 are isolated from each other by the first and second cutoff valves 20 and 21. Consequently, the piston 8 can decrease the brake fluid pressure Pw independently of the master cylinder pressure Pm by increasing the volume of the closed fluid chamber 14. In this way, the anti-skid brake control system of this embodiment can decrease the brake fluid pressure Pw of the wheel cylinder 5 even if the master cylinder pressure Pm is increasing or unchanging, and by so doing prevent wheel slip. By the rightward movement, the piston 8 decreases the volume of the second chamber 15. However, a movable member of the accumulator 22 moves axially, and the accumulator 22 functions as a means for absorbing a change of the volume of the second chamber 15 and facilitating the movement of the piston 15. Thus, the fluid pressure in the enclosed second chamber 15 does not prevent the rightward movement of the piston 9.

When the motor 25 is at rest, the piston 9 is held stationary, and holds the brake fluid pressure Pw constant.

When the motor 25 is rotated in the reverse direction, the drive mechanism consisting of the motor 25, pinion 26, ball nut 23 and ball screw rod 17a causes the piston 9 to move in the leftward direction as viewed in FIG. 1, and reduce the volume of the closed first fluid chamber 14. The anti-skid system increases the brake fluid pressure by moving the piston 9 leftwardly in order to prevent the brake actuation force from being decreased too much and to prevent the stopping time and distance from becoming longer. During this movement, the piston 9 increases the volume of the closed second chamber 15. However, the accumulator 22 compensates for this volume change of the second chamber 15, and thereby allows the piston 9 to move easily.

When the hydraulic system employs a compressible fluid, it is possible to omit the accumulator 22.

In the hydraulic system according to the present invention, the magnitude of a force required to move the piston 9 is very small, as explained below. In the following mathematical expressions, Po is an initial fluid pressure in the first and second chambers 14 and 15, obtained when the cutoff valves 20 and 21 are closed, A is a pressure receiving area of the piston 9, k is a spring constant of the return springs 18 and 19, and Dxo is an initial deflection of the return springs 18 and 19. When the piston 9 is moved in the rightward direction as viewed in FIG. 1, from the initial position through a distance Dx by a rightward force F, the piston 9 decreases the fluid pressure in the first chamber 14 from Po to $P_1$, and increases the fluid pressure in the second chamber 15 from $P_o$ to $P_2$. In this case, the first spring 18 is expanded through Dx from the initial deflection Dxo, and the second spring 19 is compressed through Dx from the initial deflection Dxo. The balance of the forces acting on the piston 9 is expressed as:

$$P_1 A - k(Dxo + Dx) = P_2 A - k(Dxo - Dx) - F$$

Rearrangement of this equation yield:

$$F = (P_2 - P_1)A + 2kDx \qquad (1)$$

The operating fluid used in the hydraulic system of this embodiment is an incompressible brake liquid. Accordingly, it is possible to consider that Dx is approximately equal to zero ($Dx \approx 0$). Furthermore, a pressure variation DP in the first chamber 14 is equal to that of the second chamber 15. That is, $$P_1 = P_o + DP$$

$$P_2 = P_o - DP$$

Therefore, the following equation is obtained from the equation (1).

$$F = 2(A \cdot DP + kDx) \approx 2A \cdot DP$$

$\therefore kDx \approx 0$ Namely, the force F required to vary the brake fluid pressure Pw by moving the piston 9 is approximately equal to the pressure variation DP multiplied by 2A, and the force F is independent of the magnitude of the brake fluid pressure Pw. In the hydraulic modulator 1 of the present invention, the torque motor 25 can push or pull the piston 9 with a relatively small force even if the brake fluid pressure Pw is high. Therefore, it is possible to reduce the sizes of the torque motor 25 and the modulator 1.

The drive mechanism of this embodiment employs the torque motor 25, and causes the piston 9 to move so that a relationship between a control input and a stroke of the piston 9 is fixed. The output torque of the motor 25 is proportional to an electric current supplied to the motor 25. Therefore, the anti-skid control system of this embodiment can control the wheel cylinder pressure linearly by controlling the motor current during anti-skid operation. The relationship between the wheel cylinder pressure Pw and the control signal delivered from the controller 27 to the torque motor 25 is linear over a wide range. The anti-skid controller 27 can accurately control the wheel cylinder pressure Pw without delay by producing the anti-skid control signal so that the control characteristic of the fluid pressure with respect to the control signal is constant. It is optional to employ a solenoid in place of the motor 25. In this case, the solenoid is arranged to reciprocate the piston 9 by pushing or pulling the piston 17. The hydraulic modulator 1 of the present invention does not require any air pressure source and any air valve as in a conventional modulator using a diaphragm mechanism (Japanese Patent Publication No. 56-254). Therefore, the hydraulic modulator of the invention is small in size.

Figure 4:
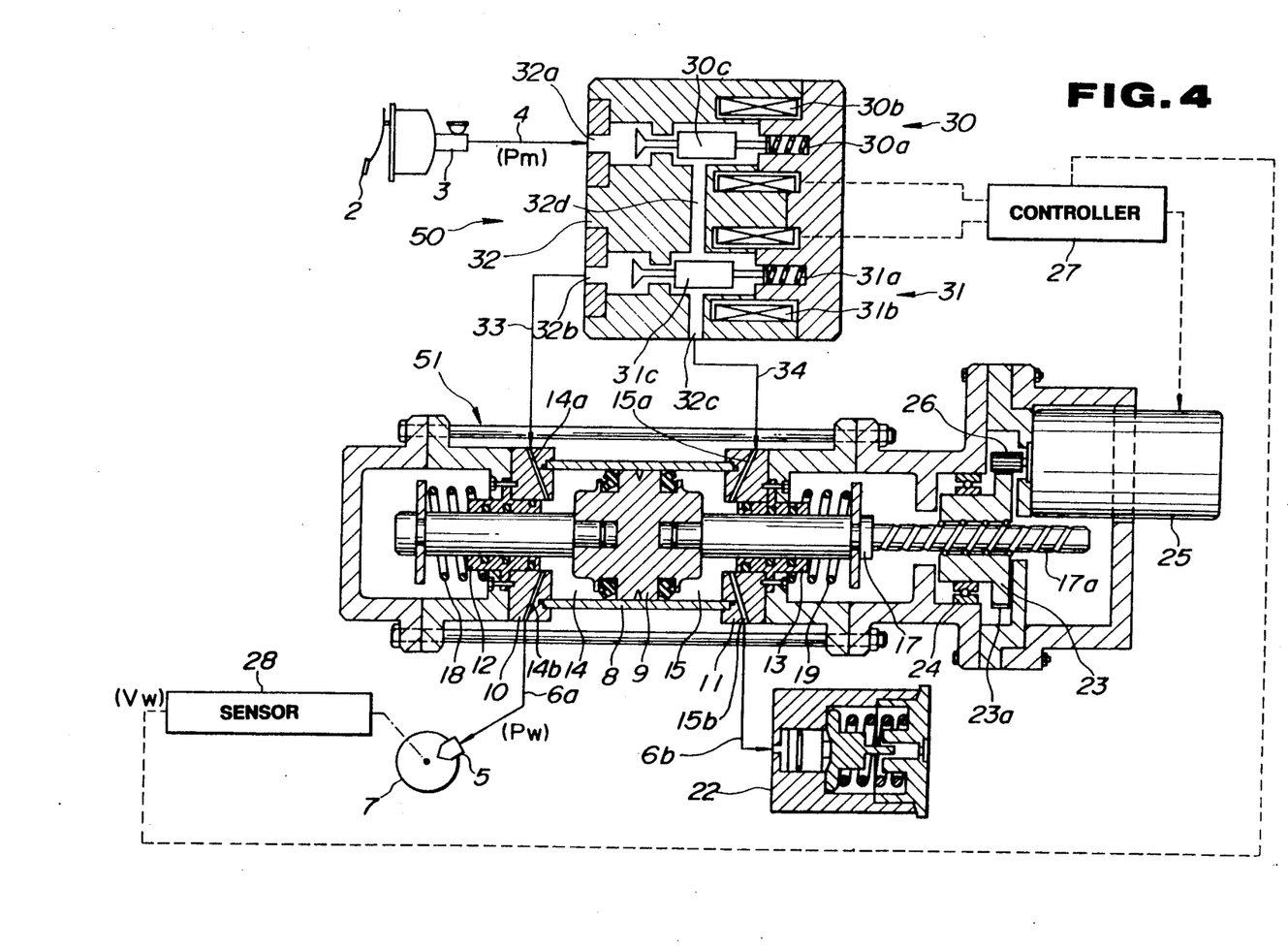
Figure 5:
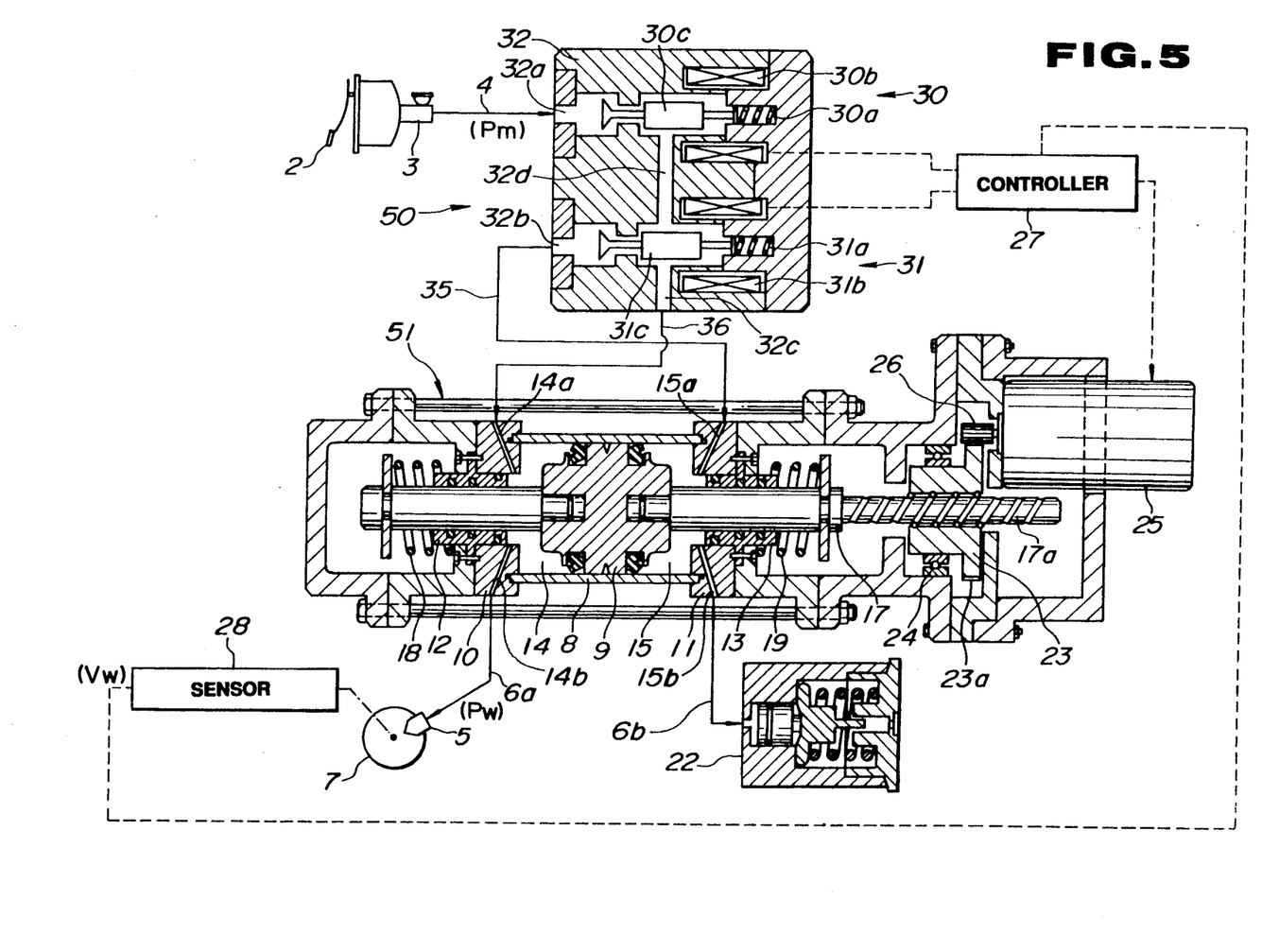
FIG. 5 is a schematic view showing a variation of the second embodiment.
Figure 7A:
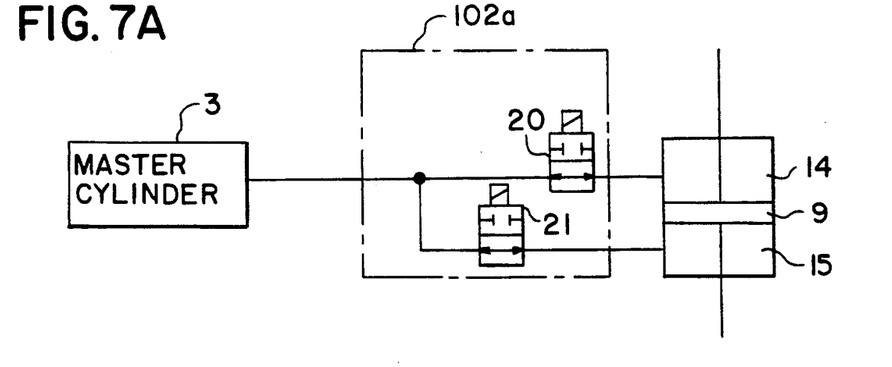
FIGS. 7A, 7B and 7C are schematic views showing the valve arrangements of the first, second and third embodiments respectively.
Figure 7B:
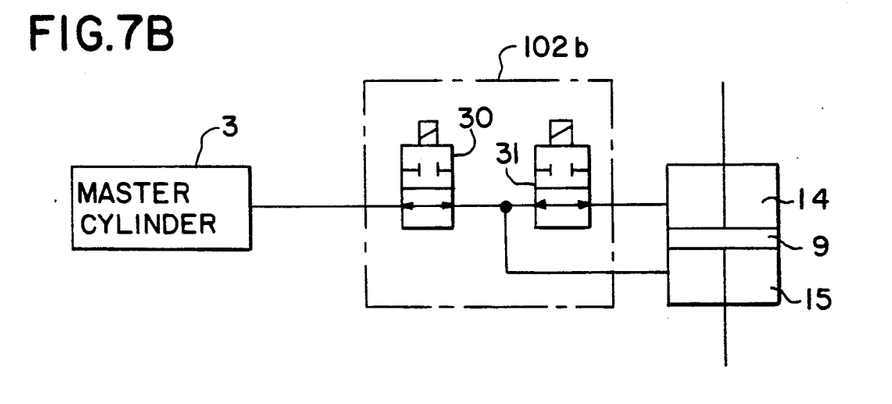
Figure 7C:
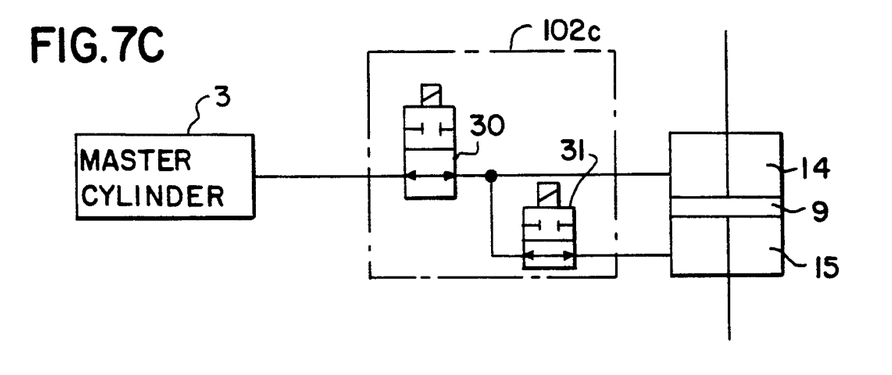

A second embodiment of the present invention is shown in FIG. 4. FIG. 5 show a variation of the second embodiment. Fluid pressure control systems shown in FIGS. 4 and 5 are also designed for the anti-skid brake control, and almost the same as the system of the first embodiment. In the second embodiment and its variation, first and second cutoff valves 30 and 31 are connected in series as shown in FIGS. 7B and 7C, whereas the first and second cutoff valves 20 and 21 of the first embodiment are connected in parallel, as shown in FIG. 7A. In the parallel arrangement of the first embodiment, there can arise a difference between the initial pressures of the first and second chambers 14 and 15 if the first and second cutoff valves 20 and 21 fail to close the respective passages at the same time because of a difference in property between the first and second valves 20 and 21, and if the brake pedal force is changed during the interval from the closure of one valve to the closure of the other valve. The series arrangements shown in FIGS. 4 5, 7B, and 7C can avoid such a possibility and ensure the equilibrium of the initial fluid pressures of the first and second chambers 14 and 15. In the example shown in FIG. 7B corresponding to FIG. 4, the series circuit of the first and second cutoff valves 30 and 31 is interposed between the master cylinder 3 and the first chamber 14. In FIG. 7C corresponding to FIG. 5, the series circuit is interposed between the master cylinder 3 and the second chamber 15. In both FIGS. 7B and 7C, the first cutoff valve 30 is capable of isolating the first and second chambers 14 and 15 from the pressure source, but incapable of isolating both chambers from each other. In FIG. 7B, the second cutoff valve 31 is capable of isolating the first chamber 14 from both of the pressure source 3 and chamber 15, but incapable of isolating the first chamber 14 from the pressure source 3 (if the first valve 30 is open). On the other hand, the second cutoff valve 31 of FIG. 7C is arranged to isolate the second chamber 15 from both of the pressure source 3 and the first chamber 14.

The hydraulic modulator 1 shown in FIG. 4 includes a valve assembly 50 and a cylinder assembly 51. In this embodiment, the valve assembly 50 is separate from the cylinder assembly 51. The valve assembly 50 corresponds to the valve means shown as 102b in FIG. 7B. The cylinder assembly 51 includes the piston 9, the housing members for defining the first and second chambers 14 and 15, the return springs 18 and 19, and the drive mechanism for pushing and pulling the piston 9. The cylinder assembly 51 is constructed in the same manner as in the first embodiment. The cylinder assembly 51 includes the electric torque motor 25.

The valve assembly 50 includes a valve housing 32 which is formed with an inlet port 32a, a first outlet port 32b, a second outlet port 32c and an intermediate passage 32d. Each of the first and second cutoff valves 30 and 31 has a spring 30a or 31a, a solenoid 30b or 31b and a movable valve elements 30c or 31c. Each valve is normally held open by the action of the spring 30a or 31a, and closed by the solenoid 30b or 31b when the solenoid is energized. The inlet port 32a is connected with the master cylinder 3 by the master cylinder pressure supply passage 4. The first outlet port 32b is connected with the first fluid chamber 14 by a first inlet branch passage 33. The second outlet port 32c is connected with the second fluid chamber 15 by a second inlet branch passage 34, as shown in FIG. 4.

The cylinder assembly 51 has a cylinder housing which is composed of the cylinder member 8, end members 10 and 11, and seal members 12 and 13 as in the first embodiment. The cylinder housing is formed with a first inlet port 14a for introducing the fluid pressure from the passage 33 into the first chamber 14, a second inlet port 15a for introducing the fluid pressure from the passage 34 into the second chamber 15, a first outlet port 14b for delivering the fluid pressure from the first chamber 14 to the first outlet branch passage 6a, and a second outlet port 15b for delivering the fluid pressure from the second chamber 15 to the second outlet branch passage 6b. In the examples shown in FIG. 4, these ports are formed in the end members 10 and 11.

The intermediate passage 32d of the valve assembly 50 serves as an outlet port of the first cutoff valve 30, and simultaneously as an inlet port of the second cutoff valve 31. The outlet port of the first cutoff valve 30 is connected with the inlet port of the second valve 31 (that is, both valves are connected in series), and the outlet port of the first cutoff valve 30 is in fluid communication with the outlet port 32c of the valve assembly 32. In this example, it is possible to regard the intermediate passage 32d as an extension of the common supply passage 4.

When both of the first and second cutoff valves 30 and 31 are in the open state, the master cylinder pressure Pm is transmitted to the first chamber 14 through the first and second valves 30 and 31, and the first chamber 14, and further transmitted to the accumulator 22 through the first valve 30 and the second chamber 15. The first valve 30 can isolate both of the first and second chambers 14 and 15 simultaneously from the master cylinder by cutting off the communication between the inlet port 32a and the intermediate passage 32d. When the first valve 30 is in the closed state, and the second valve 31 is in the open state, the first and second chambers 14 and 15 are isolated from the master cylinder 3, but both chambers are still held in fluid communication with each other, so that the fluid pressures in both chambers are equal to each other. The second cutoff valve 31 can isolate the first chamber 14 from the second chamber 15 by cutting off the fluid communication between the first outlet port 32b and the second outlet port 32c. When both cutoff valves 30 and 31 are in the closed state, each of the first and second chambers 14 and 15 is isolated not only from the master cylinder 3 but also from the other chamber.

In the hydraulic modulator shown in FIG. 5, the first outlet port 32b of the valve assembly 50 is connected with the second inlet port 15a of the second chamber 15 by a branch passage 35, and the second outlet port 32c of the valve assembly 50 is connected with the first inlet port 14a of the first chamber 14 by a branch passage 36. Therefore, the first cutoff valve 30 is incapable of isolating the first and second chambers 14 and 15 from each other, but capable of isolating both chambers from the pressure source. The first valve 30 is arranged in the same manner as in the example of FIG. 4. The second cutoff valve of FIG. 5 is capable of isolating the second chamber 15 from both of the pressure source 3 and the first chamber 14, but incapable of isolating the first chamber 14 from the pressure source 3 (if the first valve 30 is open). The valve assembly 50 shown in FIG. 5 corresponds to the valve means shown at 102C in FIG. 7C.

Figure 6:
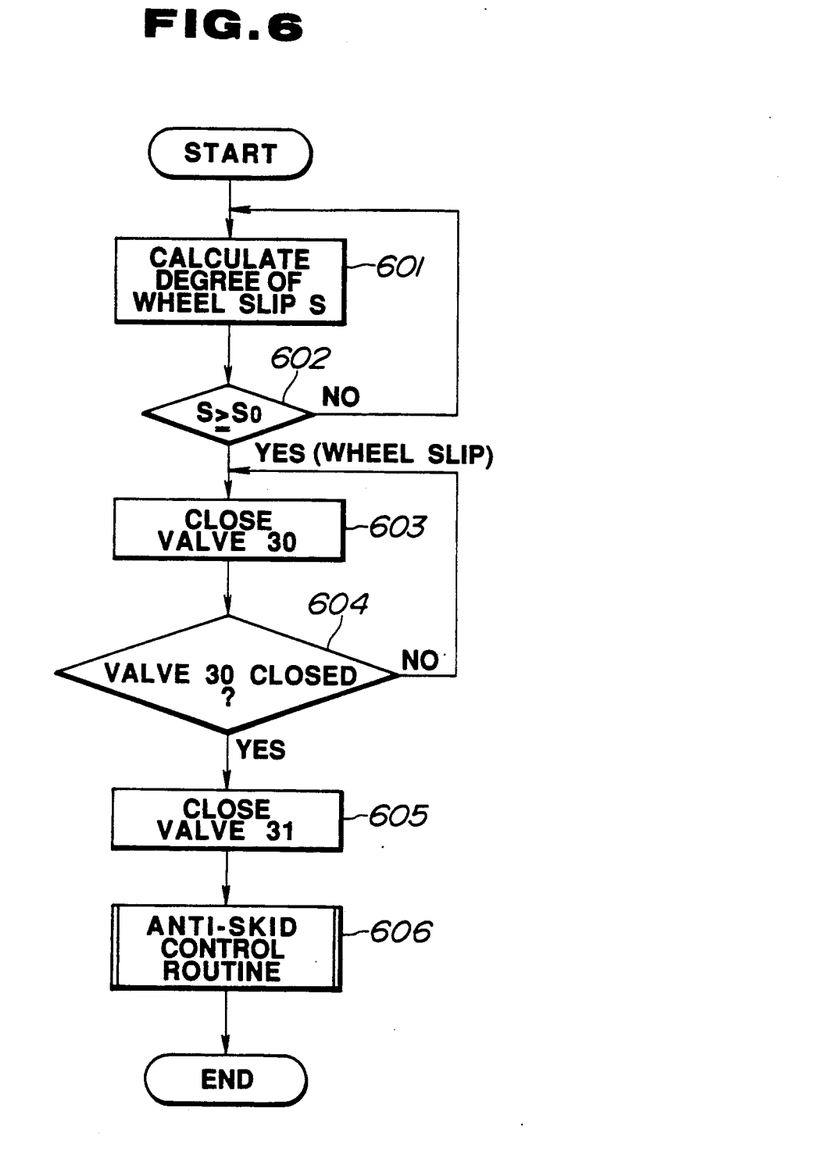
FIG. 6 shows a control program performed by a controller shown in FIG. 4 or 5.

In each of the fluid pressure control systems shown in FIGS. 4 and 5, the electronic anti-skid controller 27 closes the first and second cutoff valves 30 and 31 nonsimultaneously. FIG. 6 shows a sequence of operations performed by the controller 27. Steps 601 and 602 are substantially identical to the steps 201 and 202 shown in FIG. 2. When a wheel slip condition is detected at the step 602, the controller 27 proceeds from the step 602 to a step 603, and closes the first cutoff valve 30 by outputting a solenoid on signal to the first cutoff valve 30 at the step 603. Then, the controller 27 confirms the closure of the first valve 30 at a step 304, and closes the second cutoff valve 31 by outputting a solenoid on signal to the second valve 31 at a step 605. After the step 605, the controller 27 transfers control to the anti-skid control routine at a step 606. In this way, the controller 27 first isolates both of the first and second chambers 14 and 15 from the fluid pressure source 3 by closing the first cutoff valve 30 which is closer to the pressure source 3 and which is incapable of interrupting the fluid communication between the first and second chambers 14 and 15. In this state, the fluid pressures on both sides of the piston 9 are unavoidably made equal to each other because both chambers 14 and 15 remain fluidly connected with each other. After the first and second chambers 14 and 15 have been fluidly disconnected from the pressure source 3, the controller 27 disconnects the first and second chambers 14 and 15 from each other by closing the second cutoff valve 31. Thus, the pressure control systems shown in FIGS. 4 and 5 can ensure the initial balance of fluid pressures on both sides of the piston 9. Each of the pressure control systems shown in FIGS. 4 and 5 comprises a sequencer means for determining the sequence of the closing action of the first valve 30 and the closing action of the second valve 31. In the example shown in FIG. 6, the controller 27 serves as the sequencer means, and the steps 603, 604 and 605 correspond to the sequencer means.

The present invention is applicable not only to the anti-skid control system. The present invention is also applicable to various other fluid pressure control systems. In any case, the control system according to the present invention may further comprise, as shown in FIG. 8, a controller means 105 for controlling the valve means 102 and the drive means 103, and a sensor means 106 for sensing an operating condition of the vehicle 107. Specifically, the hydraulic modulator 1 can be used as an actuator for a vehicle traction control system.

What is claimed is:

1. A fluid pressure control system comprising:

a cylinder means comprising a piston and a means defining first and second fluid chambers separated by said piston;

a valve means for opening said first and second chambers to a fluid pressure source, and closing said first and second chambers so that said first and second chambers form, respectively, first and second closed hydraulic circuit sections which are isolated from each other and first isolated from the pressure source, wherein said valve means comprises a housing means defining an inlet port communicating with said fluid pressure supplying means, a first outlet port communicating with said first chamber, and a second outlet port communicating with said second chamber, and a movable means which is put in an open state to fluidly connect said inlet port to both of said first and second outlet port, and a closed state to isolate said first and second outlet ports from each other and further form said inlet port, said first closed hydraulic circuit section being in fluid communicating with said first outlet port and comprising said first chamber and said actuator means, said second closed hydraulic circuit section being in fluid communication with said second outlet port and comprising said second chamber;

a drive means for moving said piston to vary a volume of said first chamber and thereby to vary a fluid pressure confined in said first closed hydraulic circuit section; and further comprising a hydraulic actuator means which is fluidly connected with said first fluid chamber of said cylinder means, and a fluid pressure supplying means for increasing and decreasing a fluid pressure and supplying the fluid pressure to said hydraulic actuator means to operate said actuator means by the fluid pressure, and said valve means includes a means for opening said first and second chambers so that both chambers are fluidly connected with said supplying means, and closing said first and second chambers so that said first chamber and said actuator means are isolated from each of said supplying means and said second chamber, and that said second chamber is isolated from each of said first chamber and said supplying means.

2. A fluid pressure control system according to claim 1 wherein said actuator means comprises a wheel cylinder for converting hydraulic fluid pressure to mechanical force for actuation of a brake of a vehicle, and said supplying means comprises a brake master cylinder.

3. A fluid pressure control system according to claim 1, wherein said housing means of said valve means comprises a valve housing enclosing said movable means, and a fluid pressure conductor means defining a fluid passage extending from said inlet port to said valve housing.

4. A fluid pressure control system comprising:
 a cylinder means comprising a piston and a means defining first and second fluid chambers separated by said piston;
 a valve means for opening said first and second chambers to a fluid pressure source, and closing said first and second chambers so that said first and second chambers form, respectively, first and second closed hydraulic circuit sections which are isolated from each other and further isolated from the pressure source;
 a drive means for moving said piston to vary a volume of said first chamber and thereby varying a fluid pressure confined in said first closed hydraulic section; and
 wherein said drive means includes a means for receiving an electric control signal and reciprocating said piston in accordance with said control signal so that a relationship between a displacement of said piston and said control signal is fixed.

5. A fluid pressure control system comprising:
 a cylinder means comprising a piston and a means defining first and second fluid chambers separated by said piston;
 a valve means for opening said fist and second chambers to a fluid pressure source, and closing said first and second chambers so that said first and second chambers form, respectively, first and second closed hydraulic circuit sections which are isolated from each other and further isolated form the pressure source;
 a drive means for moving said piston to vary a volume of said first chamber and thereby varying a fluid pressure confined in said first closed hydraulic section; and
 wherein said valve means comprises a first cutoff valve for isolating said first and second chambers from the pressure source, and a second cutoff valve for isolating said first and second chambers from each other.

6. A fluid pressure control system comprising:
 a cylinder means comprising a piston and a means defining first and second fluid chambers separated by said piston;
 a valve means for opening said first and second chambers to a fluid pressure source, and closing said first and second chambers so that said first and second chambers form, respectively, first and second closed hydraulic circuit sections which are isolated from each other and further isolated from the pressure source, wherein said valve means comprises a means defining a fluid pressure supply passage extending to a branch point a first branch passage extending from said branch point to said first chamber, and a second branch passage extending from said branch point to said second chamber, said valve means further comprising first and second cutoff valves for allowing a fluid pressure to flow from said supply passage through said first and second branch passages into said first and second chambers, and isolating said first and second chambers from each other and from said pressure source by stopping fluid flow at two separate positions in said supply passage and said first and second branch passages;
 a drive means for moving said piston to vary a volume of said first chamber and thereby varying a fluid pressure confined in said first closed hydraulic section;
 wherein said valve means comprises a first cutoff valve disposed in said first branch passage for opening and closing said first branch passage, and a second cutoff valve disposed in said second branch passage for opening and closing said second branch passage, each of said first and second cutoff valves being a solenoid valve; and
 a controller means for closing and said first and second cutoff valves simultaneously by sending electric signals to each of said first and second cutoff valves.

7. A fluid pressure control system comprising:
 a cylinder means comprising a piston and a means defining first and second fluid chambers separated by said piston;
 a valve means for opening said first and second chambers to a fluid pressure source, and closing said first and second chambers so that said first and second chambers form, respectively, first and second closed hydraulic circuit sections which are isolated from each other and further isolated from the pressure source;
 a drive means for moving said piston to vary a volume of said first chamber and thereby varying a fluid pressure confined in said first closed hydraulic section;
 wherein said valve means comprises a means defining a fluid pressure supply passage extending to a branch point, a first branch passage extending from said branch point to said first chamber, and a second branch passage extending from said branch point to said second chamber, said valve means further comprising first and second cutoff valves for allowing a fluid pressure to flow from said supply passage through said first and second branch passages into said first and second chambers, and isolating said first and second chambers from each other and from said pressure source by stopping fluid flow at two separate positions in said supply passages passage and said first and second branch passages; and wherein said valve means further comprises a first cutoff valve disposed in said supply passage for opening and closing said supply passage, and a second cutoff valve disposed in one of said first and second branch passages or opening and closing the branch passage in which said second cutoff valve is disposed.

8. A fluid pressure control system according to claim 7, wherein each of said first and second cuttoff valves is a solenoid valve, and said control system further comprises a controller means for performing a first operation to close said first cutoff valve, and then initiating a second operation to close said second cutoff valve after said first operation has been finished.

9. A fluid pressure control system comprising:
a cylinder means comprising a piston and a means defining first and second fluid chambers separated by said piston;
a valve means for opening said first and second chambers to a fluid pressure source, and closing said first and second chambers so that said first and second chambers form, respectively, first and second closed hydraulic circuit sections which are isolated from each other and further isolated from the pressure source;
a drive means for moving said piston to vary a volume of said first chamber and thereby varying a fluid pressure confined in said first closed hydraulic section; and
further comprising a hydraulic actuator means which is in fluid communication with said first chamber, and a fluid pressure supplying means for supplying a fluid pressure to said hydraulic actuator means to operate said actuator means by the fluid pressure, said fluid pressure supplying means comprising a brake master cylinder for a vehicle, said hydraulic actuator means comprising a wheel cylinder for applying a brake actuation force to a wheel of said vehicle and said valve means includes a means for opening said first and second chambers so that said master cylinder is in fluid communication with all of said first and second chambers and said actuator means, and for closing said first and second chambers so that said first chamber is in fluid communication with said actuator means and out of fluid communication with said master cylinder, and from said second chamber, and that said second chamber is out of fluid communication with said master cylinder, said first chamber and said actuator means.

10. A fluid pressure control system according to claim 9, wherein said drive means comprises an electric motor and a speed reducing gear arrangement for transmitting power produced by said motor to said piston and causing said piston to move.

11. A fluid pressure control system according to claim 10 wherein said cylinder means further comprises a spring means for holding said piston in a neutral position, and each of said first and second cutoff valves is a normally open solenoid valve comprising a movable valve element, a spring for normally holding said valve element in an open position, and a solenoid for putting said valve element in a closed position when said solenoid is energized.

12. A fluid pressure control system according to claim 11, further comprising a hydraulic accumulator which is fluidly connected with said second chamber.

13. A fluid pressure control system according to claim 12, further comprises a controller means for controlling said electric motor, and for energizing and deenerging the solenoids of said first and second cutoff valves.

14. A fluid pressure control system according to claim 13, further comprising a sensor means for sensing an operating condition of a vehicle, and for sending a signal to said controller means, said sensor means comprising a wheel speed sensor for sensing angular rotation of a wheel of the vehicle, said controller means comprising an electronic logic controller for automatically controlling a degree of wheel slip of the vehicle by sending control signals to said valve means and said drive means.

15. A fluid pressure control system according to claim 11, wherein said cylinder means comprises a cylinder housing comprising a cylindrical wall defining a cylindrical bore axially extending from a first end to a second end, and first and second stationary end walls which are fixed to said cylindrical wall and which close said first and second ends of said cylindrical bore, respectively, said piston being slidable in said cylindrical bore, between said first and second end walls, and dividing said cylindrical bore into said first fluid chamber formed between said first end wall and said piston and said second fluid chamber formed between said second end wall and said piston.

16. A fluid pressure control system comprising:
a hydraulic actuator means comprising a hydraulic actuator;
a primary fluid pressure supplying means for producing primary fluid pressure to be supplied to said hydraulic actuator means, and increasing and decreasing said primary fluid pressure to control said hydraulic actuator means;
a cylinder means comprising a piston and a means defining first and second fluid chambers separated by said piston;
a valve means for transmitting said primary fluid pressure to said hydraulic actuator means to permit said primary fluid pressure supplying means to control said hydraulic actuator means and further transmitting said primary fluid pressure to each of said first and second chambers to hold fluid pressures in both chambers equal to each other, said valve means comprising a movable means for isolating first and second hydraulic circuit sections from each other and from a third hydraulic circuit section when said movable means of said valve means is put in a predetermined closed state, said first hydraulic circuit section comprising said first fluid chamber and said hydraulic actuator means and fluidly connecting said first fluid chamber and said hydraulic actuator means, said second hydraulic circuit section comprising said second fluid chamber, said third hydraulic circuit section comprising said primary fluid pressure supplying means; and
a drive means for moving said piston to vary a volume of said first fluid chamber and thereby to vary a fluid pressure confined in said first hydraulic circuit section when said valve means is in said closed state.

17. A fluid passage control system according to claim 16, wherein said valve means comprises a means defining a fluid pressure supply passage extending to a branch point a first branch passage extending from said branch point to said first chamber, and a second branch passage extending from said branch point to said second chamber, said valve means further comprising first and second cutoff valves for allowing a fluid pressure to flow from said supply passage through said first and second branch passages into said first and second chambers, and isolating said first and second chambers from each other and from said pressure source by stopping fluid flow at two separate positions in said supply passage and said first and second branch passages.

18. A fluid pressure control system according to claim 17, wherein said valve means comprises a first cutoff valve disposed in said first branch passage for opening and closing said first branch passage, and a second cutoff valve disposed in said second branch passage for opening and closing said second branch passage, each of said first and second cutoff valves being a solenoid valve.

19. A fluid pressure control system according to claim 16, wherein said hydraulic actuator is a wheel cylinder for braking a vehicle, and said primary fluid pressure supplying means comprises a brake master cylinder.

20. A fluid pressure control system according to claim 16, wherein said drive means comprises an electric motor, and a mechanical means for mechanically connecting said motor with said piston, and transmitting a mechanical force from said motor to said piston.

21. A fluid pressure control system according to claim 16, further comprising a hydraulic accumulator which is fluidly connected with said second chamber, said second hydraulic circuit section comprising said second fluid chamber and said hydraulic accumulator.

* * * * *